US010348465B2

(12) United States Patent
Bengtsson et al.

(10) Patent No.: US 10,348,465 B2
(45) Date of Patent: Jul. 9, 2019

(54) METHOD, BASE STATION AND TERMINAL FOR DETERMINING CHANNEL PROPERTIES IN A CELLULAR MULTIPLE-INPUT AND MULTIPLE-OUTPUT SYSTEM

(71) Applicant: Sony Corporation, Tokyo (JP)

(72) Inventors: Erik Bengtsson, Eslöv (SE); Kåre Agardh, Rydebäck (SE); Rickard Ljung, Helsingborg (SE); Vanja Plicanic Samuelsson, Lund (SE)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 15/128,258

(22) PCT Filed: Nov. 5, 2014

(86) PCT No.: PCT/IB2014/065808
§ 371 (c)(1),
(2) Date: Sep. 22, 2016

(87) PCT Pub. No.: WO2015/145226
PCT Pub. Date: Oct. 1, 2015

(65) Prior Publication Data
US 2017/0099125 A1    Apr. 6, 2017

(30) Foreign Application Priority Data

Mar. 28, 2014    (EP) .................................... 14162255

(51) Int. Cl.
*H04L 5/00*    (2006.01)
*H04B 7/04*    (2017.01)
(Continued)

(52) U.S. Cl.
CPC ......... *H04L 5/0048* (2013.01); *H04B 7/0413* (2013.01); *H04B 7/0452* (2013.01);
(Continued)

(58) Field of Classification Search
CPC ............... H04B 7/0413; H04L 5/0048; H04W 72/0446; H04W 72/085; H04W 72/1273; H04W 88/08
See application file for complete search history.

(56) References Cited

U.S. PATENT DOCUMENTS

2004/0005887 A1* 1/2004 Bahrenburg ............ H04J 13/18
455/422.1
2006/0280113 A1* 12/2006 Huo ....................... H04L 5/0048
370/208
(Continued)

FOREIGN PATENT DOCUMENTS

AU    2012 261 509 A1    12/2012
EP    2763470 A1    8/2014
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211, Mar. 18, 2014.
(Continued)

*Primary Examiner* — Awet Haile
(74) *Attorney, Agent, or Firm* — Tucker Ellis LLP

(57) ABSTRACT

A cellular multiple-input and multiple-output, MIMO, system comprises a base station having a plurality of antennas. Pilot signals are received by the base station in each frame of a sequence of frames (60). The base station analyzes the pilot signals to determine radio channel properties of radio channels between respectively each one of a plurality of terminals and the base station. The sequence of frames (60) comprises frames of a first frame type (61, 63, 64, 68) and frames of a second frame type (62, 69). Each frame of the second frame type (62, 69) have a greater number of time slots in which the base station receives the pilot signals than
(Continued)

each frame of the first frame type (61, 63, 64, 68). The frames of the second frame type (62, 69) are included periodically in the sequence of frames (60).

14 Claims, 8 Drawing Sheets

(51) Int. Cl.
| | |
|---|---|
| *H04B 7/0452* | (2017.01) |
| *H04L 1/16* | (2006.01) |
| *H04L 1/18* | (2006.01) |
| *H04B 7/0413* | (2017.01) |
| *H04L 5/14* | (2006.01) |
| *H04W 72/04* | (2009.01) |
| *H04W 72/08* | (2009.01) |
| *H04W 72/12* | (2009.01) |
| *H04W 88/08* | (2009.01) |

(52) U.S. Cl.
CPC .......... *H04L 1/1671* (2013.01); *H04L 1/1896* (2013.01); *H04L 5/1469* (2013.01); *H04W 72/0446* (2013.01); *H04W 72/085* (2013.01); *H04W 72/1273* (2013.01); *H04W 88/08* (2013.01)

(56) References Cited

U.S. PATENT DOCUMENTS

| | | |
|---|---|---|
| 2012/0281566 A1 | 11/2012 | Pelletier |
| 2013/0121300 A1 | 5/2013 | Cho |
| 2013/0163536 A1 | 6/2013 | Anderson |
| 2013/0222182 A1 | 8/2013 | Nakasato |
| 2013/0315215 A1 | 11/2013 | Beale |
| 2015/0327263 A1* | 11/2015 | Chen ................ H04W 72/0446 370/280 |
| 2015/0358133 A1* | 12/2015 | Kusashima ........... H04W 16/14 370/280 |

FOREIGN PATENT DOCUMENTS

| | | |
|---|---|---|
| WO | 2012/109439 A1 | 8/2012 |
| WO | 2013/047129 A1 | 4/2013 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213, Dec. 1, 2008.

International Search Report and Written Opinion from counterpart International Patent Application No. PCT/IB2014/065808, dated May 29, 2015.

* cited by examiner

METHOD, BASE STATION AND TERMINAL FOR DETERMINING CHANNEL PROPERTIES IN A CELLULAR MULTIPLE-INPUT AND MULTIPLE-OUTPUT SYSTEM

TECHNICAL FIELD

Embodiments of the invention relate to cellular communication systems. Embodiments relate in particular to methods and devices for pilot signaling in cellular multiple-input and multiple-output (MIMO) systems. Embodiments of the invention relate to a method and MIMO base station for determining channel properties and to a terminal of a MIMO system.

BACKGROUND ART

Mobile data and voice communication continues to evidence significant growth. With increasing popularity of data and voice communication, it is more likely that the communication needs of a large number of users must to be met which are all located within a small area, a case referred to as dense crowd scenario or dense cell population in the art. Typical examples include sport arenas or large office buildings.

In order to increase data transmission performance and reliability, the so-called multiple input and multiple-output (MIMO) technology may be used in wireless radio telecommunication for transmitting information between a base station and terminals of users. MIMO systems may use multiple send and receive antennas for wireless communication at a base station. The MIMO technology forms the basis for coding techniques which use the temporal as well as the spatial dimension for transmitting information. The enhanced coding provided in MIMO systems allows a quality and data rate of the wireless communication to be increased, which makes the use of MIMO techniques attractive.

In a massive MIMO system, the base station may include a large number of antennas, e.g. several tens or even in excess of one hundred antennas with associated transceiver circuitry. The extra antennas of the MIMO base station allow radio energy to be spatially focused which improves cell capacity and radiated energy efficiency.

In order to adapt the transmit signal at each individual antenna of the base station in accordance with the currently active terminals a base station logic needs information about radio channel properties between the terminals and the antennas. The channel properties depend on the relative position between the terminal and the plurality of antennas of the base station. The signal footprint detected at the plurality of antennas, which may be quantified by a footprint matrix, may vary depending on the direction and also the distance in which the terminal is located. The signal footprint may also vary depending on the environment, as signals may be reflected or scattered at objects in the environment of the terminal and the base station. The channel properties may be used for focusing energy of radio signals when transmitting signals downlink or when retrieving data from uplink signals.

The terminals transmit a training sequence as pilot signal. The training sequences need to be orthogonal in order for the base station to identify the configuration parameters for the plurality of antennas for each of the one of the terminals in conventional systems. Orthogonality may be achieved by using time division multiple access (TDMA), code division multiple access (CDMA) or frequency division multiple access (FDMA) technologies or a combination thereof.

For a MIMO system which uses time division duplex (TDD) orthogonality is attained in the time domain. Each terminal can transmit a pilot signal which can be received by the antennas and analyzed by the base station logic. In order to not interfere with each other, a certain time period can be assigned in each system frame where each terminal may transmit its pilot signal. A header of a conventional frame may include time slots in which the terminals may transmit their pilot signals. The remaining time slots of the conventional frame may be used for downlink (DL) and uplink (UL) data transmission.

Massive MIMO systems may be deployed in buildings such as office buildings, shopping malls, sport arenas or other areas in which a large density of users can occur. Such situations are also referred to as "dense crowd" or "dense cell population" in the art of cellular communication systems. In such environments a large number of terminals may be located in the cell served by the MIMO base station. The time required for the pilot signaling of the terminals in each frame may increase with the number of terminals. For a large number of terminals, the time required for all terminals to transmit their pilot signals may exceed the available pilot signaling time in each frame. While the pilot signaling time, i.e. the number of time slots allocated to pilot signaling, may be adjusted dynamically, the transmission of payload data would be negatively affected if the pilot signaling time in each frame was increased to much. Accordingly, there is an upper limit for the pilot signaling time in each frame beyond which the payload data transmission would be negatively affected.

With increasing popularity of the so-called internet of things (ITO), the number of machine-type communication terminals located in a cell is expected to increase. Examples for such machine-type communication terminals include sensors or other devices which only require small data rates but nevertheless may need to remain synchronized to a base station. The ITO increases the risk that there may be dense cell populations, with many of the devices requiring low data rates only.

Dense cell populations may create a risk that some users or even a large number of users may be overseen due to the lack of available time slots for pilot transmission. Some of the users that are overseen may be active and ready for a connection, whereas some of the users that are assigned the time slots for transmitting pilot signals may be in idle mode and do not need the connection. Smart scheduling techniques for allocating terminals to available time slots may mitigate such problems to some extent, but the conventional resource allocation schemes for pilot signaling may still not allow the base station to reliably see all terminals that may be ready for a connection when in dense cell population scenarios.

SUMMARY

There is a need in the art for methods and devices which address at least some of the above shortcomings of conventional systems. There is in particular a need in the art for allocating resources for pilot signaling in a multiple-input and multiple-output (MIMO) system which allows a base station to reliably receive pilot signals from a large number of terminals even in dense cell population scenarios.

According to embodiments of the invention, methods and devices are provided in which a time division duplex (TDD) frame may be periodically used in which a greater number of pilot time slots is provided for pilot signaling and scheduling. In some embodiments, a full TDD frame may be periodically utilized for a transmission of pilot signals which include training sequences and for a transmission of scheduling information. This allows the base station to at least periodically see a larger number of terminals and increases the number of terminals seen at the base station in the MIMO system while keeping the pilot signaling time in the other frames moderate.

Since a whole frame may periodically be used for pilot signaling and scheduling control it will enable an extensive increase in a number of handled terminals compared to only using conventional frames which have limited header sizes because they also must provide downlink (DL) and uplink (UL) data slots. The new frame type—which will also be referred to as a frame of a second frame type in the following—allows a ratio of pilot and associated control time slots compared to data slots to be decreased in a sequence of several frames.

According to an embodiment, a method of determining radio channel properties in a cellular multiple-input and multiple-output (MIMO) system is provided. The cellular MIMO system comprises a base station having a plurality of antennas. The plurality of antennas receives pilot signals in each frame of a sequence of frames. The base station analyzes the pilot signals to determine the radio channel properties of radio channels between respectively each one of a plurality of terminals and the base station. The sequence of frames comprises frames of a first frame type which respectively have a first number of time slots in which the base station receives the pilot signals, and frames of a second frame type which respectively have a second number of time slots in which the base station receives the pilot signals. The second number of time slots may be greater than the first number of time slots. The frames of the second frame type may be included periodically in the sequence of frames.

In each frame of the second frame type, half of the time slots may be used for pilot signals. Another half of the time slots may be used for scheduling. The half of the time slots for pilot signals may be the first half of the frame.

In at least a fraction of the frames of the second frame type, some time slots may be used for uplink and/or downlink payload data transmission. The for uplink and/or downlink payload data transmission in the frames of the second frame type may be used for communication with machine communication terminals or other terminals which have data rates that are less than a data rate threshold.

The frames of the second frame type may consist of a plurality of pairs of time slots. Each pair of time slots may be associated with respectively one terminal.

Each pair of time slots may comprise a pilot time slot for receiving a pilot signal from a terminal at the base station, and an acknowledgment time slot for transmitting a message from the base station to the terminal. The acknowledgment time slot may be separated from the pilot time slot by a time gap. Several other time slots may be provided between the pilot time slot and the acknowledgment time slot for each terminal.

The pilot signal received in one time slot of a pair of time slots may include a request for data or a request for idle mode operation. The request may be processed by the base station in the time gap. The acknowledgment may allocate a pilot time slot in a frame of the second frame type to the terminal when the base station accepts a transition of the terminal to the idle mode, for example.

The message transmitted from the base station to the terminal may comprise scheduling information specifying a time slot in which the terminal is to transmit its pilot signal.

The base station may transmit a positive or negative acknowledgment message to the terminal in the acknowledgment time slot. A positive acknowledgment message may be accompanied by scheduling information. The scheduling information may indicate a time slot in which the terminal may transmits its pilot signal.

The base station may receive uplink payload data and/or may transmit downlink payload data in at least a fraction of the frames of the second frame type.

The base station may receive the uplink payload data in the frames of the second frame type from machine communication terminals. Alternatively or additionally, the base station may transmit the downlink payload data to the machine communication terminals in the frames of the second frame type.

The base station may determine the fraction of the frames of the second frame type in which payload data may be included in dependence on a number of machine communication terminals or in dependence on a density of machine communication terminals.

Frames of the second frame type which include uplink payload data and/or downlink payload data may be alternated with frames of the second frame type which do not include payload data.

The base station may dynamically adjust the fraction of the frames of the second frame type which include uplink payload data and/or downlink payload data. The base station may perform an optimization routine which depends on data rate requirements of at least some terminal devices to adjust the fraction of the frames of the second frame type which include uplink payload data and/or downlink payload data.

The base station may allocate time slots in the frames of the second frame type to a sub-set of terminals located in a cell served by the base station.

The base station may determine whether a terminal is to be included in the sub-set based on whether the terminal is in active mode or in idle mode. A terminal in idle mode may be more likely to be assigned to transmit its pilot signal in frames of the second frame type than a terminal in active mode. In some embodiments, only terminals in idle mode may be assigned to transmit pilot signals in the periodically recurring frames of the second frame type. Idle terminals do not need to be assigned to transmit pilot signals in frames of the second frame type, but may also continue to transmit pilot signals in frames of the first frame type. For illustration, if the total number of terminals in the cell is small, idle terminals may continue to transmit pilot signals in frames of the first frame type.

Alternative or additional criteria may be employed by the base station to determine whether a terminal is to be included in the sub-set of terminals such that it can transmit its pilot signal only in the periodically occurring frames of the second frame type.

A plurality of frames of the first frame type may be used respectively in between a frame of the second frame type and the next frame of the second frame type.

The frames of the first frame type may be conventional frames for MIMO systems which include a header for pilot signals and scheduling, and which additionally include several time slots for DL and UL data transmission.

A majority of time slots in the frames of the first frame type may respectively be used for DL and UL data transmissions.

Smart scheduling may be performed at least for terminals which transmit their pilot signals in frames of the first frame type. The smart scheduling may cause at least some terminals to transmit their pilot signals not in each frame of the first frame type, but periodically such that other terminals may use the same time slot for transmitting their pilot signals in the intervening frames of the first frame type.

The base station may cause several terminals which transmit pilot signals in frames of the first frame type to respectively share one time slot in the frames of the first frame type for transmitting their respective pilot signals.

The base station may perform downlink control signaling to cause the several terminals to transmit their pilot signals in the frames of the first frame type in an alternating manner.

A number of frames of the first frame type between two successive frames of the second frame type may be a power of two. This facilitates smart scheduling schemes, e.g. when different pilot signal transmission rates for several terminals which share one time slot for pilot signaling are supported.

In the MIMO system, UL payload data and DL payload data may be transmitted only in frames of the first frame type. The frames of the second frame type may consist entirely of time slots for pilot signals and time slots for acknowledgments and scheduling, without any time slots for payload data transmission.

The plurality of antennas may be controlled based on the determined radio channel properties to focus radio energy at a terminal. The determined radio channel properties may reflect relative amplitudes and phase or time shifts of a pilot signal received from a terminal at the plurality of antennas. The radio channel properties may be defined by a so called footprint matrix of the pilot signal at the plurality of antennas. The footprint matrix may include information on phase shifts and amplitudes of the radio signals received at the plurality of antennas and caused by the pilot signal of a terminal. The radio channel properties may be used by the base station to control a transmission of signals through the plurality of antennas to focus a radio signal towards the respective terminal when transmitting downlink and/or for retrieving data from uplink transmissions from the terminal. The control based on the footprint matrix may be performed in the digital domain.

Both the frames of the first frame type and the frames of the second frame type may be TDD frames.

The base station may inform a terminal which is to transmit a pilot signal in frames of the first frame type that it is assigned to the frames of the first frame type. The respective terminal will then be silent in any frame of the second frame type in order to not contaminate the pilot signaling by, e.g., idle terminals in the frames of the second frame type.

A terminal which is in idle mode and which shall transmit its pilot signal in frames of the second frame type may be allocated to a pilot time slot number which does not exist in frames of the first frame type. This causes the terminal not to transmit a pilot signal in frames of the first frame type. No signaling in addition to the allocation of the pilot slot number which does not exist in frames of the first frame type is required.

A base station for a cellular MIMO system according to an embodiment comprises a plurality of antennas configured to receive pilot signals in each frame of a sequence of frames. The sequence of frames comprises frames of a first frame type which respectively have a first number of time slots in which the base station receives the pilot signals, and frames of a second frame type which respectively have a second number of time slots in which the base station receives the pilot signals. The second number of time slots is greater than the first number of time slots, and the frames of the second frame type may be included periodically in the sequence of frames. The base station comprises a logic coupled to the plurality of antennas and configured to analyze the pilot signals to determine radio channel properties of radio channels between each one of a plurality of terminals and the base station.

The base station may be configured to perform the method of any one of the embodiments disclosed herein. The respective control and evaluation operations may be performed by the base station logic.

A terminal for a cellular MIMO system according to an embodiment comprises a wireless interface for communication with a base station of the MIMO system. The terminal comprises a control device coupled to the wireless interface and configured to select a frame type for transmission of pilot signals from a first frame type and a second frame type. A frame of the second frame type has a greater number of time slots for pilot signals than a frame of the first frame type. The control device is configured to control the wireless interface to transmit pilot signals only in frames of the selected frame type, wherein frames of the second frame type are included periodically in a sequence of frames which comprises several frames of the first frame type in between two consecutive frames of the second frame type.

A terminal having such a configuration can be assigned by a base station to transmit pilot signals in the periodically occurring frames of the second frame type.

The control device may be configured to select the frame type based on signaling received from the base station. The signaling may be an allocation of a pilot time slot. For illustration, a terminal may be allocated a pilot time slot that does not exist in frames of the first frame type. This causes the terminal to only transmit pilot signals in frames of the second frame type.

The control device may be configured to control the wireless interface such that no payload data are transmitted to the base station in the frames of the second frame type.

The control device may be configured to control the wireless interface such that, if the first frame type is selected, the terminal transmits its pilot signal according to scheduling information received from the base station.

The control device may be configured to control the wireless interface such that, if the first frame type is selected, the terminal may transmit its pilot signal in an allocated time slot of non-consecutive frames of the first frame type to share the allocated time slot with at least one further time slot.

The control device may be configured to control the wireless interface such that the pilot signal includes a request for data or a request for entering an idle mode.

The control device may be configured to control the wireless interface such that uplink payload data is transmitted in at least a fraction of the frames of the second frame type.

The terminal may be configured such that downlink payload data is received in at least the fraction of the frames of the second frame type.

The terminal may be mobile phone.

The terminal may be a machine communication terminal. The terminal may be a sensor or other device which has low data rate requirements.

A cellular MIMO system according to an embodiment comprises a base station according to an embodiment and at least one terminal according to an embodiment.

In any one of the various embodiments, the MIMO system may be a massive MIMO system. The base station may include more than ten antennas, e.g. several tens of antennas, to transmit and receive signals. The base station may include more than hundred antennas to transmit and receive signals.

Embodiments of the invention may be used for resource allocation for pilot signaling and scheduling in MIMO systems, in particular in massive MIMO systems.

Exemplary scenarios in which the frame of the second frame type may be included are dense cell population scenarios, e.g. sport arenas. Embodiments of the invention allow a base station to periodically receive pilot signals from a large number of terminals.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF DRAWINGS

Embodiments of the invention will be described in more detail with reference to the accompanying drawings in which like numerals refer to like elements.

DESCRIPTION OF EMBODIMENTS

In the following, exemplary embodiments of the present invention will be described in more detail. It is to be understood that the features of the various exemplary embodiments described herein may be combined with each other unless specifically noted otherwise. Same reference signs in various drawings refer to similar or identical components. Any coupling between components or devices shown in the figures may be a direct or an indirect coupling unless specifically noted otherwise.

Figure 1:
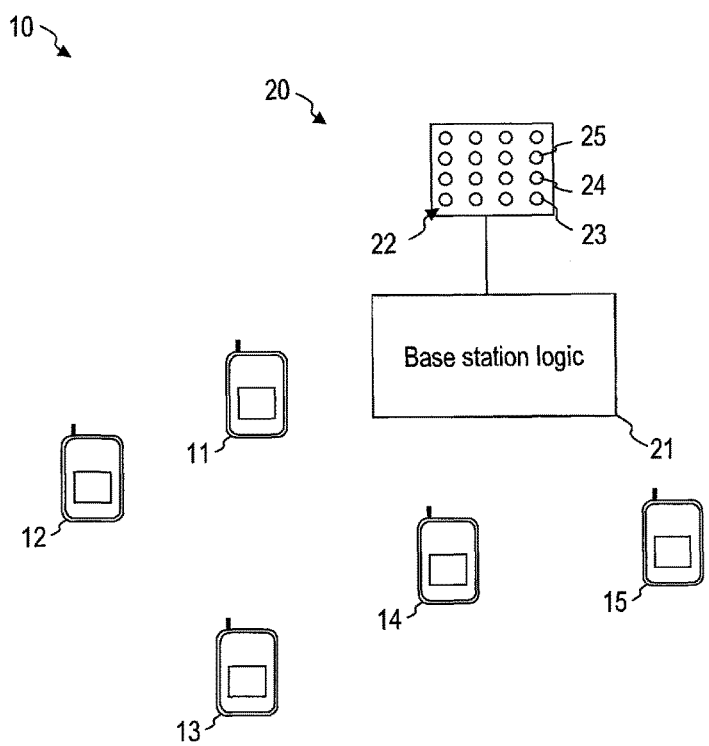
FIG. 1 shows a schematic representation of a communication system according to an embodiment.

FIG. 1 shows a communication system 10 according to an embodiment. The communication system 10 is a multiple-input and multiple-output (MIMO) system and includes a MIMO base station 20 according to an embodiment. The MIMO system may be a massive MIMO system.

The base station 20 comprises a plurality of antennas 22. Antennas 23-25 of the plurality of antennas 22 may be arranged in a two- or three-dimensional spatial arrangement on a carrier. The base station 20 also comprises associated transceivers for the antennas 23-25. The base station 20 may be a base station for a massive MIMO system. Accordingly, the base station 20 may have several tens or in excess of one hundred antennas 23-25. The plurality antennas 22 may also be distributed over a several locations. For illustration, in cooperative MIMO, several sets of antennas may be used in a system.

The communication system 10 comprises several terminals 11-15 configured to communicate with the base station 20. Each one of the terminals 11-15 is configured to transmit a pilot signal to the base station 20. The pilot signal may respectively include a training sequence. The pilot signal may be a MIMO pilot signal.

The terminals 11-15 may have different data rate requirements. One or several of the terminals 11-15 may be machine communication terminals. For illustration, a machine communication terminal 14 or several machine communication terminals 14, 15 may require a data rate which is much less than a data rate required by terminal 11.

The base station 20 is configured to analyze the pilot signal received at the plurality of antennas 22 of the base station to determine radio channel properties for a radio signal transmission between the plurality of antennas 22 of the base station 20 and the respective terminal 11-15. For illustration, a logic 21 of the base station 20 may be configured to determine phase or time shifts between the pilot signal as it received by the various antennas 23-25 of the plurality of antennas, as well as the amplitude information of the received signal. Such information may also be referred to as footprint or a footprint matrix of the pilot signal and the plurality of antennas. The footprint matrix may be a multi-dimensional array of complex numbers which encode the phase shifts and amplitude changes of the pilot signal which includes the training sequence for the respective terminal. The footprint matrix may be used for directing a sensitivity lobe of the plurality of antennas towards a terminal to focus radio energy.

The logic 21 may use the radio channel properties, e.g. the footprint matrix, to control a transmission of signals and the processing of received signals. The logic 21 may use the footprint matrix to perform control operations, e.g. in the digital domain, which cause radio signals transmitted by the plurality of antennas 22 onto the respective terminal or when retrieving data from a radio signal received from the respective terminal. The logic 21 may compute a Hermitian conjugate of the footprint matrix to determine a time delay and amplitudes of radio signals transmitted by each one of the plurality of antennas 22 to focus radio energy at the respective terminal when transmitting radio signals. These operations may be performed in the digital domain. For illustration, the logic 21 may control a transmission of radio signals through the plurality of antennas 22 based on radio channel properties, e.g. based on a footprint matrix, obtained for a pilot signal transmission from a terminal 11 to control a transmission of radio signals through the plurality of antennas 22 to transmit a downlink (DL) signal carrying control signaling and/or payload data to the terminal 11 such that radio energy is focused at the terminal 11. The logic 21 may control a transmission of radio signals through the plurality of antennas 22 based on radio channel properties, e.g. based on a footprint matrix, obtained for a pilot signal transmission from a terminal 12 to control a transmission of radio signals through the plurality of antennas 22 to transmit a DL signal carrying control signaling and/or payload data to the terminal 12 such that radio energy is focused at the terminal 12. This similarly applies to transmissions to the other terminals 13-15. The base station may also use the radio channel properties, e.g. the footprint matrix, obtained for a pilot signal transmission from one of the terminals 11-15 for processing radio signals received from the respective terminal. A processing based on the footprint matrix, which may be implemented in the digital domain may be performed for uplink and downlink communication, in which a sensitivity of the plurality of antennas 20 is directed towards the receiving or transmitting terminal, respectively.

The MIMO system 10 may use time division duplex (TDD) for the transmission of pilot signals. TDD may also be used for the transmission of data. A pilot time slot may be allocated to each terminal 11-15 in which the respective terminal may transmit its pilot signal. The allocation in the time domain ensures that the various terminals 11-15 do not interfere with each other when transmitting the pilot signals.

Figure 2:
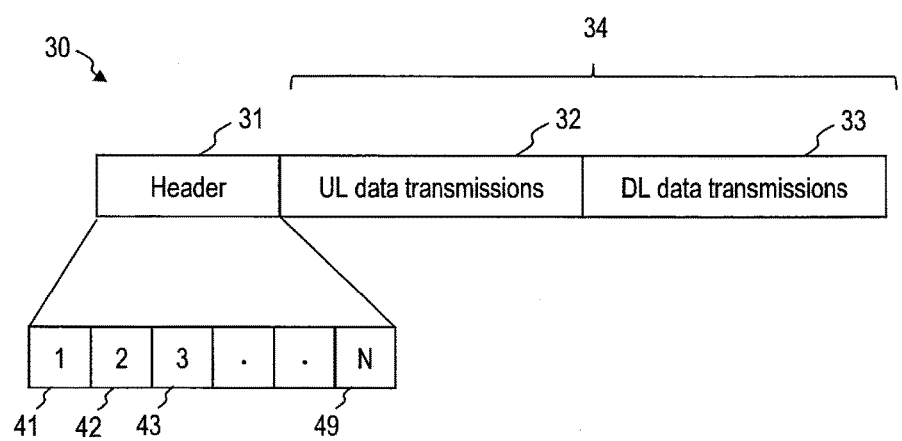
FIG. 2 shows a frame structure of frame of a first frame type.

FIG. 2 is a schematic representation of a frame 30 used in the MIMO system 10. The frame 30 includes a portion 32 for uplink data transmissions and another portion 33 for downlink data transmission. Each one of the portions 32, 33 includes a plurality of time slots. The portions 32, 33 may collectively also be referred to as data portion 34 of the frame 30 in which payload data may be transmitted.

In addition, the frame 30 includes several time slots 41-49 which are allocated for the transmission of pilot signals from the terminals 11-15 to the base station 20 and for the transmission of messages, such as positive or negative acknowledgments, associated with the pilot signals to the terminals 11-15. The several time slots 41-49 may be provided in a header 31 of the frame 30, which may also be referred to as pilot portion. The several time slots 41-49 do not need to be included in the first time slots of the frame, but may also be distributed in other ways over the frame 30. The total number of time slots used for pilot signals may, but does not need to be fixed. For illustration, the MIMO system 10 may be configured such that the number of time slots for transmission of pilot signals may be dynamically adjusted, for example to accommodate varying numbers of active terminals which have a connection as long as the number of active terminals does not get too large.

A conventional MIMO frame 30 as illustrated in FIG. 2 will also be referred to as frame of a first frame type herein to distinguish it from the novel frames which are provided in embodiments of the invention, as will be described in more detail below.

The base station 20 may be configured to perform various scheduling operations. The base station 20 may perform scheduling such that a terminal may be allocated slots to transmit or receive data in each frame of the first frame type, but may be caused to transmit pilot signals in a sub-set of the frames of the first frame type. This may be suitable for a terminal with a low mobility and high data rate.

The base station 20 may perform scheduling such that a frame rate for a terminal is reduced, with pilot signals and data being transmitted in the frames of the first frame type. This may be suitable for a terminal with high mobility and low data rate.

The base station 20 may perform scheduling such that pilot signals are transmitted at a frame rate which is lower than in every frame of the first frame type. This may suitable for a terminal which has a high mobility but no data.

The base station 20 may perform scheduling such that pilot signals and data are transmitted in every frame of the first frame type. This may suitable for a terminal which has a high mobility but no data.

These various scheduling options, as well as other scheduling options, co-exist for different terminals. Terminals may be selectively allocated to transmit their pilot signals in frames of a second frame type when there is a congestion in the header of the frames of the first frame type, as will be explained in more detail next.

As will be explained in more detail with reference to FIG. 3 to FIG. 12, the MIMO system 10 is configured such that TDD frames which have a greater number of time slots for pilot signaling than the conventional may be periodically included in a sequence of frames. For illustration, a frame of the second frame type may allow the base station to receive pilot signals from terminals in half of all time slots of the frame of the second frame type and to transmit messages associated with the pilot signaling, e.g. positive or negative acknowledgment messages and/or scheduling information, to the terminals in another half of the time slots of the frame of the second frame type. After a frame of a second frame type, there may be several frames of the first frame type which each provide a number of time slots for pilot signals which is less, and which may be much less, than half the total number of time slots in the frame of the first frame type. The several frames of the first frame type may be provided in direct succession to each other. The next frame of the second frame type may be included after the several frames of the first frame type. The frames of the second frame type may be periodically inserted into the sequence of frames, with a frame of the second frame type respectively occurring after a number M of frames of the first frame type.

For terminals which are assigned to transmit their pilot signals in the frames of the second frame type, the base station may receive the pilot signal in a time slot of the frame of the second frame type. The base station may receive the pilot signal in an allocated time slot of each second frame to periodically determine radio channel properties for the respective terminal whenever a frame of the second frame type occurs. For a frame of the second frame type, the base station may receive pilot signals in each time slot in the first half of the frame of the second frame type.

The base station may transmit a message associated with the pilot signal, e.g. a positive or negative acknowledgment message and/or scheduling information, to the terminal in another time slot of the respective frame. The time slot in which the base station transmits the positive or negative acknowledgment message to a terminal may be separated, in the time domain, from the time slot in which the base station received the pilot signal from the terminal by a plurality of time slots.

The base station may allocate time slots in frames of the second frame types to terminals depending on pre-defined criteria. For illustration, the base station may allocate time slots in the frames of the second frame types to terminals which are in idle mode. It is not required that each idle mode terminal is allocated a time slot in the frames of the second frame type. At least some terminals in idle mode may continue to use the frames of the first frame type of pilot signal transmission. When the total number of terminals in the cell is such that most pilot signals may still be transmitted in frames of the first frame type, the base station may allocate time slots in the frames of the second frame types to terminals which are in idle mode.

A terminal which is assigned to transmit its pilot signal in a frame of the second frame type may transmit its pilot signal only in the periodically occurring frames of the second frame type. The terminal may receive an acknowledgment from the base station in respectively another time slot of the same frames of the second frame type. The acknowledgment may be a positive acknowledgment which includes scheduling information. The scheduling information may also cause the terminal to start transmitting its pilot signal in frames of the first frame type. This may be the case when the terminal is ready for a connection and its pilot signaling is allocated by the base station to the header of frames of the first frame type.

The periodically occurring frames of the second frame type may include frames of the second frame type which do not include any payload data and frames of the second frame type which include payload data. The frames of the second frame type which include payload data may be included in an alternating manner, e.g. after a number P of frames of the second frame type which do not include payload data. The fraction of frames of the second frame type which include payload data may be adjusted dynamically by the base station, e.g. in accordance with an optimization routine. The optimization routine may take into account the communication needs of both machine communication terminals and terminals which are not machine communication terminals.

The frames of the second frame type which periodically occur in the sequence of frames allow the base station to periodically see a larger number of terminals, e.g. terminals which are in idle mode or which otherwise do not require active downlink or uplink data transmissions. The pilot signaling of these terminals does no longer need to be included in the headers of the frames of the first frame type, which frees resources for uplink and downlink data transmissions in the frames of the first frame type.

Smart scheduling may be employed to allocate time slots in headers of the frames of the first frame type to terminals. For illustration, several terminals may share one time slot in frames of the first frame type in such a manner that the several terminals alternatingly transmit their pilot signals in different frames of the first frame type.

Figure 3:
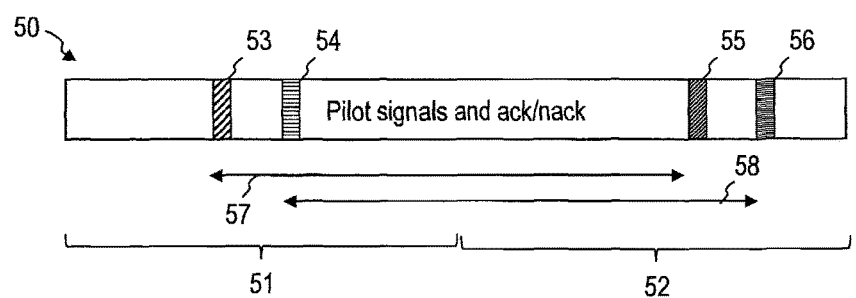
FIG. 3 shows a frame structure of frame of a second frame type used in embodiments of the invention.

FIG. 3 shows a frame of the second frame type 50 which is periodically included in a sequence of frames in methods and devices according to embodiments. The entire frame 50 is utilized for pilot signals and signaling associated with the pilot signals, e.g. positive or negative acknowledgments for the pilot signals and/or scheduling information.

For each terminal assigned to transmit its pilot signal in the periodically occurring frames of the second frame type 50, the frame of the second frame type 50 includes a time slot 53 in which the terminal may transmit its pilot signal. This time slot 53 will also be referred to as pilot time slot 53 herein. The frame of the second frame type 50 include a time slot 55 in which the base station is scheduled to transmit a message associated with the pilot signal to the respective terminal. This time slot 55 is also referred to as acknowledgment time slot 55 herein. The acknowledgment time slot 55 is separated in the time domain from the associated pilot time slot 53 by a delay 57. The delay 57 allows the base station to process the pilot signal received at the plurality of antennas 20 in the pilot time slot 53 and to generate the message transmitted in the acknowledgment time slot 55. The delay 57 may also allow the base station to determine whether the terminal shall start transmitting its pilot signals in headers of frames of the first frame type or to make other scheduling decisions. The pilot signal received at the pilot time slot 53 may include a request for data or a request for entering the idle mode. The base station may process the request in the delay 57. A response to the request may be included in the acknowledgment transmitted in the acknowledgment time slot 55.

A pair of pilot time slot and associated acknowledgment time slot may be included in the frame of the second frame type 50 for each other terminal which transmits its pilot signal in the frame of the second frame type 50. This is schematically illustrated for a pilot time slot 54 in which another terminal may transmit its pilot signal and an acknowledgment time slot 56 in which the base station may transmit an acknowledgment and/or scheduling information to the other terminal The acknowledgment time slot 56 and the pilot time slot 54 are separated in time by a delay 58. The delay 58 may have the same size as the delay 57. The acknowledgment time slot 56 and the pilot time slot 54 associated with one terminal may be separated by the same number of time slots as the acknowledgment time slot 55 and the pilot time slot 53 associated with another terminal.

The frame of the second frame type 50 may be configured such that a first half 51 of the frame of the second frame type 50 may be used for receipt of pilot signals at the base station. A second half 52 of the frame of the second frame type 50 may be used for a transmission of acknowledgment messages and/or pilot scheduling information to the terminals which are assigned to transmit their pilot signals in the frames of the second frame type 50. Other configurations of the frames of the second frame type 50 may be used.

Terminals which transmit their pilot signals in a pilot time slot 53, 54 of the frames of the second frame type 50 may use the messages 55, 56 for synchronizing against the base station. The messages 55, 56 may also be synchronization messages.

Figure 4:
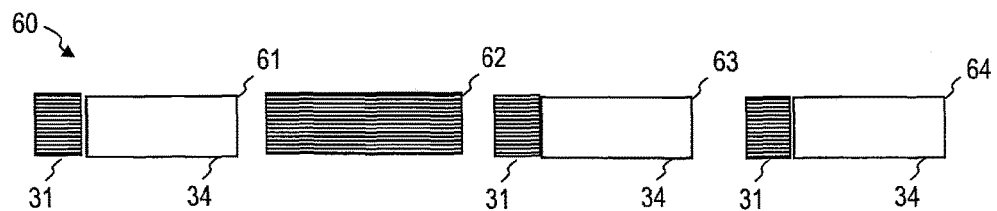
FIG. 4 shows a sequence of frames in a communication system according to an embodiment.

FIG. 4 is a schematic diagram of a sequence of frames 60. The sequence of frames 60 includes frames of the first frame type 61, 63, 64. A frame of the second frame type 62 may be inserted in between two frames of the first frame type 61, 63.

Each frame of the first frame type 61, 63, 64 includes a data portion 34 in addition to the header 31 for pilot signaling. Each frame of the second frame type 62 includes a larger number of time slots for pilot signals than each frame of the first frame type 61, 63, 64. The frames of the second frame type 62 may not include any data portion. As will be explained in more detail with reference to FIG. 10 to FIG. 12, at least a fraction of the frames of the second frame type 62 may include payload data. The payload data may be used to accommodate the communication between the base station and terminals which have data rates smaller than a data rate threshold. Machine communication terminals may be one exemplar for such terminals.

One half of each frame of the second frame type 62 may consist of time slots for pilot signals, while the other half of each frame of the second frame type 62 may consist of time slots for downlink messages associated with the pilot signals, such as acknowledgments and scheduling information.

Figure 5:
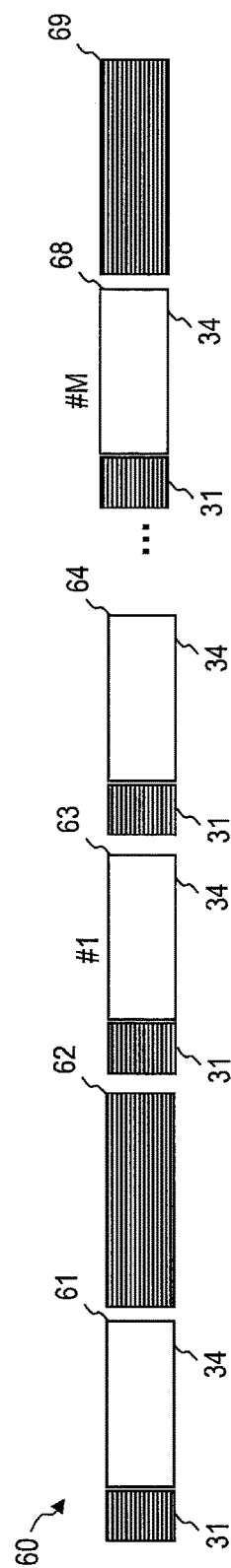
FIG. 5 shows a sequence of frames in a communication system according to an embodiment.

FIG. 5 is a schematic diagram of a sequence of frames 60. The sequence of frames 60 includes frames of the first frame type 61, 63, 64, 68. Frames of the second frame type 62, 69 may be included periodically in the sequence of frames. A number M of frames of the first frame type 63, 64, 68 may be provided in between a frame of the second frame type 62 and the next frame of the second frame type 69. The insertion of a frame of the second frame type may be repeated periodically, respectively after a number M of frames of the first frame type.

The number M of frames of the first frame type between two frames of the second frame type may be an even number. The number M of frames of the first frame type may be a power of two, $M=2^K$, where K is a positive integer. In particular, K may be equal to or greater than two, for example. When a number $M=2^K$ of frames of the first frame type 63, 64, 68 is respectively included in between a frame of the second frame type 62 and the next frame of the second frame type 69, smart scheduling may be facilitated in which several terminals share one pilot time slot in the frames of the first frame type 63, 64, 68, as will be explained in more detail with reference to FIG. 7.

Terminals may be assigned to transmit their pilot signals in the frames of the second frame type 62, 69 based on any one or any combination of a variety of criteria. In particular, terminals may be assigned to transmit their pilot signals in the frames of the second frame type 62, 69 when the terminals are in idle mode. It is not required that each terminal in idle mode transmits its pilot signal in frames of the second frame type. Some or even all terminals in idle mode may also still be allocated time slots in the frames of the first frame type for pilot signal transmission.

Figure 6:
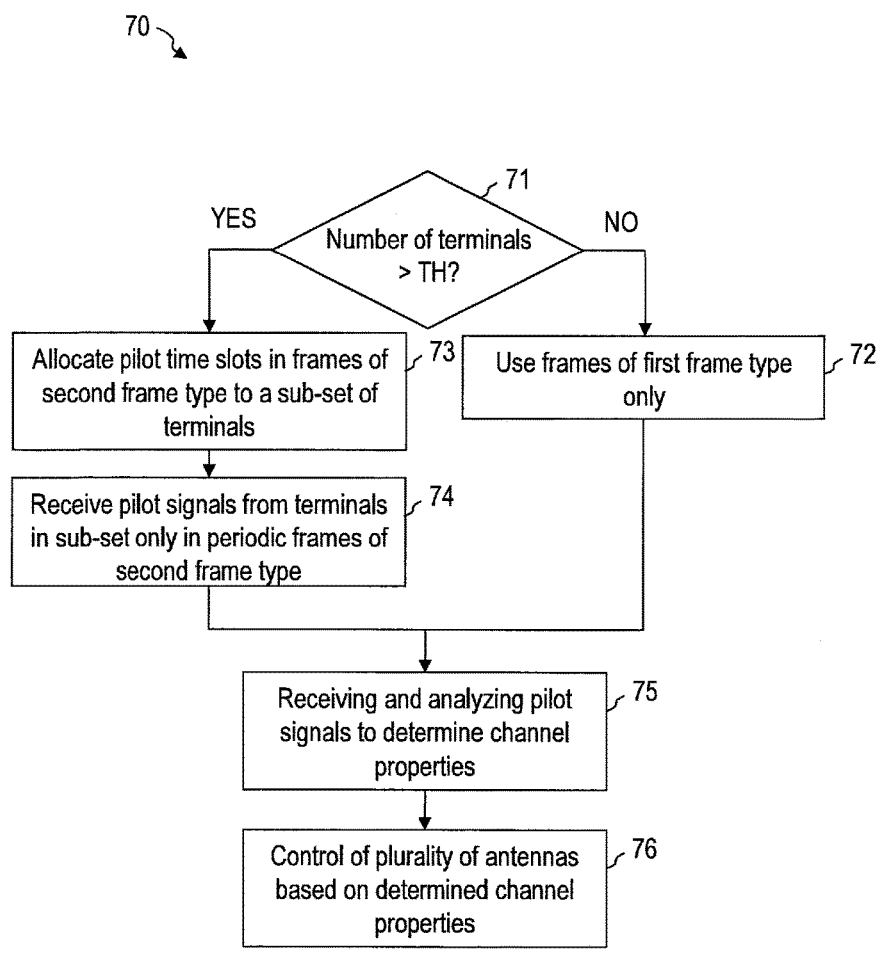
FIG. 6 is a flow chart of a method performed by a base station according to an embodiment.

FIG. 6 is a flow chart of a method 70 which may be performed by a base station 20 according to an embodiment.

At 71, the base station may determine whether the total number of terminals in the cell is greater than a threshold TH. If the number of terminals does not exceed the threshold TH, only frames of the first frame type are used at 72. At 72, the base station may perform a resource allocation which causes the terminals to transmit their pilot signals in the header of conventional MIMO frames as explained with reference to FIG. 2. Scheduling information may be included in the acknowledgment messages transmitted by the base station to the respective terminals to schedule the transmission of pilot signals.

If the number of terminals is greater than the threshold TH, the method proceeds to step 73. The base station may monitor the usage of the header of the conventional MIMO frames for pilot signaling to determine whether frames of the second frame type shall be utilized periodically. The threshold TH may, but does not need to be equal to or less than the total number of time slots in the header of the conventional MIMO frame. For illustration, and as will be explained in more detail with reference to FIG. 7, the base station may be configured to request several terminals to share one time slot in the header of frames of the first frame type. In this case, it may become necessary to start using the frames of the second frame type only when the number of terminals becomes much greater than the number of time slots in the header.

At 73, time slots in the periodically inserted frames of the second frame type may be used for the transmission of pilot signals and the transmission of downlink acknowledgment messages and/or pilot scheduling information to a sub-set of terminals. The sub-set of terminals which may transmit its pilot signal only in the periodically inserted frames of the second frame type may be selected based on criteria such as terminal mode, terminal movement, etc. The sub-set of terminals which transmit their pilot signals in the periodically occurring frames of the second frame type may consist of terminals in idle mode, for example. It is not required that all terminals in idle mode transmit their pilot signals in the periodically occurring frames of the second frame type.

At 74, the base station receives pilot signals from the terminals in the sub-set only in the periodic frames of the second frame type. In the periodic frames of the second frame type, the base station may respectively receive a pilot signal in each time slot of a first half of the frame of the second frame type. The base station may transmit a positive or negative acknowledgment message to each terminal of the sub-set in time slots of a second half of the frame of the second frame type.

Another sub-set of terminals may continue to transmit their pilot signals in headers of frames of the first frame type. The other sub-set may be disjoint with the sub-set of terminals which transmit their pilot signals in the frames of the second frame type. At least some terminal of the other sub-set may transmit their pilot signals in each frame of the first frame type. The base station may also include scheduling information into an acknowledgment message to perform smart scheduling by which terminals of the other sub-set may be selectively caused to share a time slot for pilot signaling with at least one other terminal, as will be explained with reference to FIG. 7.

At 75, the base station logic 21 analyzes pilot signals received in the frames of the second frame type and in the headers of the frames of the first frame type. The analyzing may comprise determining parameters for controlling configuration parameters of the plurality of antennas 22 when transmitting radio signals into a sector in which the terminals are respectively located and/or for processing signals received at the plurality of antennas from the various terminals. The analyzing may comprise determining a footprint matrix for the terminals and computing the Hermitian conjugate of the footprint matrix to determine time delays and relative signal amplitudes for focusing radio energy at the terminal.

At 76, the base station logic 21 may control the transmission of radio signals through the plurality of antennas 22 to focus radio energy towards a terminal to receive radio signals from the terminal or to transmit radio signals to the terminal. The time delays i.e. phase shifts, and the amplitudes of the signals transmitted by the plurality of antennas 22 at step 76 may be set based on the channel properties determined at step 75.

Even when a terminal may transmit its pilot signal in frames of the first frame type, the terminal may share the time slot in the header of the frames of the first frame type with one or more other terminals. The base station may transmit one or several parameters to the at least two terminals which shall share a time slot of a header of the frames of the first frame type. The one or more parameters may comprise an indicator for a repetition rate at which the respective terminal may transmit its pilot signal. The one or more parameters may comprise a queue indicator assigning the respective terminal to one of several queues so as to ensure that terminals which share a time slot for pilot signal transmission do not transmit their pilot signals simultaneously.

Figure 7:
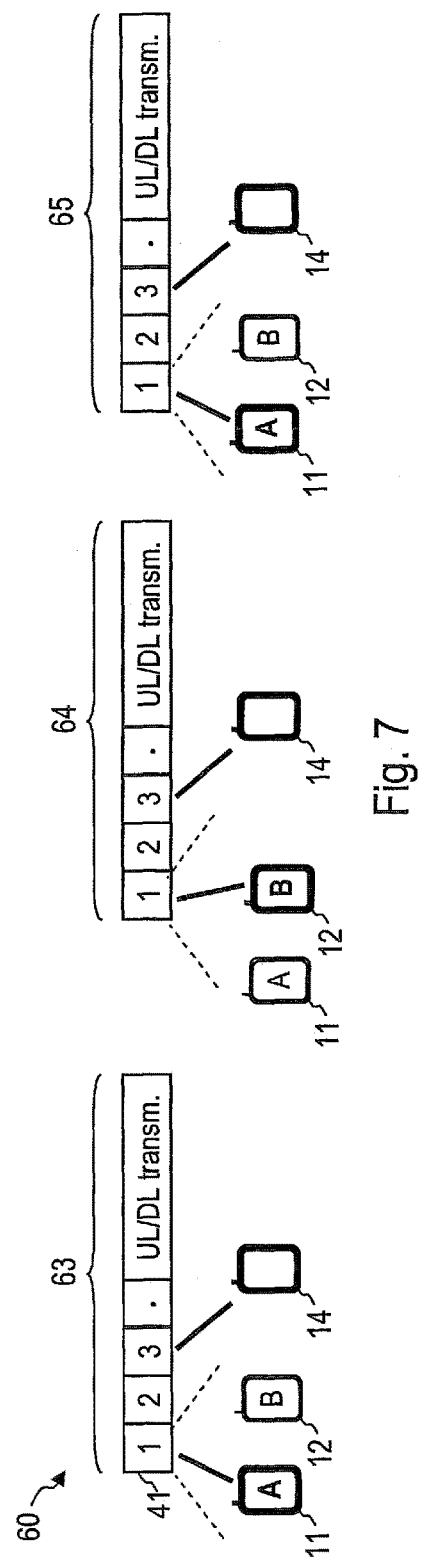
FIG. 7 shows a portion of a sequence of frames in a communication system according to an embodiment.

FIG. 7 illustrates the operation of the MIMO system 10 when the base station 20 causes the first terminal 11 and the second terminal 12 to share a first time slot 41 of the N time slots in the header, for example. Other pilot time slots may respectively be allocated to only one terminal. For illustration, a third pilot time slot may be allocated to a further terminal 14. Frames of the second frame type (not shown in FIG. 7) may be periodically included in the sequence of frames. In a sequence of frames 60 shown in FIG. 7, terminals which transmit a pilot signal in the respective frame are indicated with thicker lines than terminals which do not transmit pilot signals in the respective frames.

In a frame of the first frame type 63, the first terminal 11 transmits its pilot signal in the first pilot time slot 41, while the second terminal 12 does not transmit any pilot signal in the frame of the first frame type 63. The further terminal 14 may transmits its pilot signal in the pilot time slot of the frame of the first frame type 63 which is allocated to it.

In a next frame of the first frame type 64, the second terminal 12 transmits its pilot signal in the first pilot time slot 41, while the first terminal 11 does not transmit any pilot signal in the frame of the first frame type 64. The further terminal 14 may transmits its pilot signal in the pilot time slot of the frame of the first frame type 64 which is allocated to it.

The several terminals 11, 12 which share the first time slot 41 may continue to alternatingly transmit the pilot signals, implementing an alternation in pilot signal transmission in a round robin fashion. For illustration, in a next frame of the first frame type 65, the first terminal 11 may transmit its pilot signal in the first pilot time slot 41, while the second terminal 12 does not transmit any pilot signal in the frame of the first frame type 65. The further terminal 14 may transmits its pilot signal in the pilot time slot of the frame of the first frame type 65 which is allocated to it.

While not shown in FIG. 7 for clarity, each one of the time slots for pilot signaling in the header may be allocated to at least one terminal for transmission of pilot signals. There may also be other pilot time slots, in addition to the first pilot time slot 41, which are respectively shared among at least two terminals.

Several terminals may be assigned to share the same time slot for pilot signal transmission in the header of the frame of the first frame type when the several terminals are located along one line of sight from the base station. Several terminals may also be assigned to share the same pilot time slot if it is determined that no separate MIMO pilot signaling is required for the several terminals.

When several terminals share the same time slot for pilot signal transmission, the various terminals do not need to transmit pilot signals at the same repetition rate. For illustration, one of the several terminals may transmit pilot signals more frequently, i.e. at a higher repetition rate, than other terminals.

Referring to a case with three terminals which are made to share one time slot for pilot signaling in the frames of the first frame type, one of the three terminals may be allowed to transmit its pilot signal once in $2^1=2$ frames of the first frame type, i.e., in every second frame. The other two terminals which share the time slot for pilot signaling may each be allowed to transmit their pilot signals once in $2^2=4$ frames of the first frame type, i.e., in every fourth frame of the first frame type.

Generally, terminals which share one time slot may be allowed to transmit their respective pilot signals once in every $2^{R_i}$ frames, where $R_i$ is an indicator for the repetition rate and i is an index for the terminals which share the respective time slot. The number of frames of the first frame type which is provided between a frame of the second frame type and the next frame of the second frame type may be set to be equal to $2^{(max, R_i)}$, such that each of the several terminals which share a time slot for pilot signaling may transmit its pilot signal in at least one frame of the first frame type in between the two frames of the second frame type. The number of frames of the first frame type which is provided between a frame of the second frame type and the next frame of the second frame type may be equal to an $L \times 2^{(max, R_i)}$, where L is an integer equal to or greater than one and $max_i R_i$ designates the maximum of $R_i$ for the various terminals which share one time slot for pilot signaling. The repetition rate may also be defined in other ways, e.g. by simply specifying in which fraction of frames a terminal which shares one time slot with another terminal may transmit its pilot signal. The number of frames of the first frame type is not limited to being a power of two, but may also have other values.

Various criteria may be employed by the base station 20 to determine whether the terminal(s) which share a pilot time slot with other terminals is/are allowed to transmit pilot signals more frequently than the other terminals. For illustration, a terminal for which the footprint matrix detected at the base station varies rapidly may be allowed to transmit pilot signals more frequently. E.g., a terminal which moves more rapidly in a direction transverse to a line of sight of the base station than the other terminals which share the same pilot time slot may be allowed to transmit pilot signals more frequently. Other criteria may be used. For illustration, changes in the channel properties determined by the base station logic 21 as a function of time may be monitored. A terminal for which the channel properties exhibit more rapid changes than for other terminals, e.g. due to movement of the terminal or due to shadowing effects, may be allowed to transmit pilot signals more frequently.

The base station may use DL control signaling dedicated to respectively each one of the several terminals 11, 12 assigned to the same pilot time slot to provide information on the transmission of pilot signals. The DL control signaling may include information on the pilot time slot n which is to be shared by the several terminals 11, 12 and may be an acknowledgment message transmitted to the respective terminals by the base station in response to receiving a pilot signal, for example.

Figure 8:
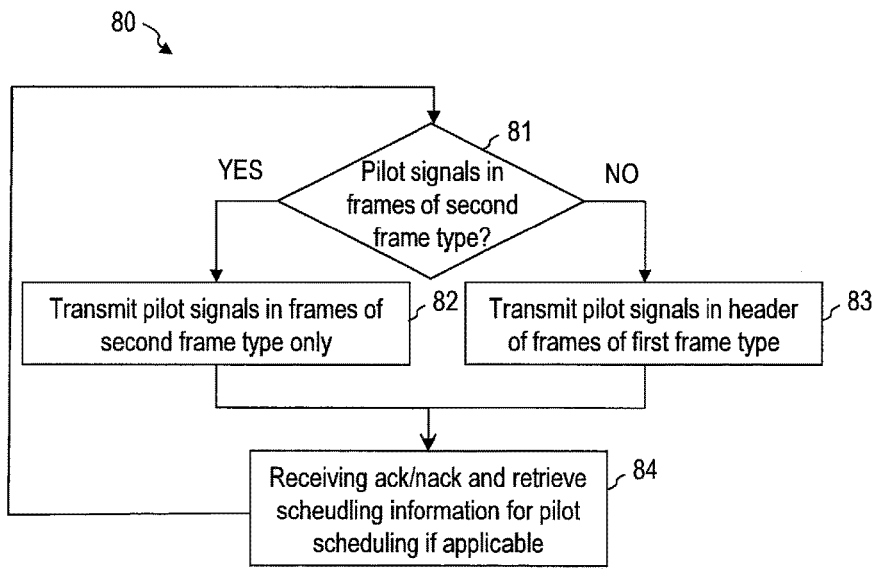
FIG. 8 is a flow chart of a method performed by a terminal according to an embodiment.

FIG. 8 is a flow chart of a method 80 performed by a terminal 11-15 according to an embodiment. The terminal 11-15 may be responsive to control signaling received from the base station. The terminal 11-15 may be configured to selectively transmit its pilot signal either in a time slot of a header of frames of the first frame type or in a time slot of frames of the second frame type. The terminal 11-15 may be configured to transmit its pilot signal in the periodic frames of the second frame type only when it is in idle mode, for example, and the number of terminals in the cell is so large that some pilot signals should be removed from headers of the frames of the first frame type. The allocation of resources for the pilot signaling may be performed under the control of the base station 20.

At 81, the terminal determines whether it is to transmit its pilot signal in frames of the second frame type only. The determining may be performed based on control signaling received from the base station.

At 82, if the terminal determines that it is to transmit its pilot signal in frames of the second frame type only, the terminal transmits pilot signals in frames of the second frame type only. The base station may allocate any time slot in the first half of a frame of the second frame type to the terminal to transmit its pilot signal.

At 83, if the terminal determines that it shall not transmit its pilot signal in frames of the second frame type only, the terminal transmits pilot signals in a time slot in a header of frames of the first frame type. The terminal may, but does not need to transmit its pilot signal in each frame of the first frame type. For illustration, the terminal may share a time slot with one or more other terminals, as explained with reference to FIG. 7. The terminal may transmit its pilot signal in non-consecutive frames of the first frame type, respectively in a time slot allocated to it by the base station 20.

At 84, the terminal receives a positive or negative acknowledgment from the base station. When the terminal transmits its pilot signal in the first half of a frame of the second frame type, the terminal may receive the acknowledgment for the pilot signal in the second half of the frame of the second frame type. The positive or negative acknowledgment message may include scheduling information which indicates a time slot to be used by the terminal for transmitting its pilot signal. The positive or negative acknowledgment message may also be used for synchronization with the base station. The method may return to step 81.

Figure 9:
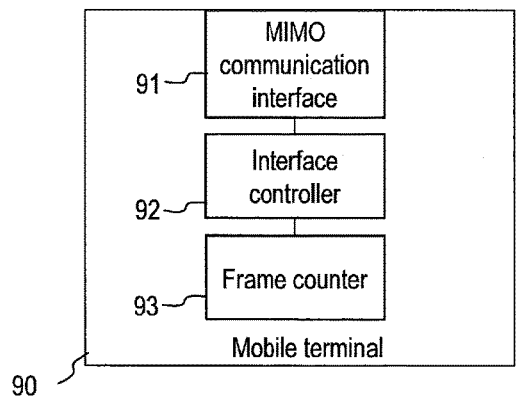
FIG. 9 is a block diagram of a terminal according to an embodiment.

FIG. 9 is a schematic block diagram of a terminal 90 according to an embodiment, which may be a mobile phone. The terminal 90 has an interface 91 configured for communication with a massive MIMO base station 20. The interface 91 has at least one antenna and may also include several antennas.

The terminal 90 has an interface controller 92. The interface controller 92 may include one or several processors, for example. The interface controller 92 may be configured to control the interface 91 to transmit a pilot signal. The pilot signal may include a training sequence. The interface controller 92 may be configured to identify frames in which the terminal 90 may transmit its pilot signal. The interface controller 92 may in particular be configured to determine whether the terminal 90 may transmit its pilot signal in frames of the second frame type only. The interface controller may control the interface 91 to transmit the pilot signal in an allocated pilot time slot of frames determined in accordance with parameters received from the base station at the interface 91.

When the terminal 90 is to transmit pilot signals in frames of the second frame type only, the interface controller 92 may be configured to control the interface 91 such that the terminal 90 does not transmit any pilot signal in the M frames of the first frame type in between two frames of the second frame type.

When the terminal 90 is to transmit pilot signals in frames of the first frame type only, the interface controller 92 may be configured to control the interface 91 such that the terminal 90 does not transmit any pilot signal in the frames of the second frame type which are respectively included after M frames of the first frame type.

The terminal 90 may have a frame counter unit 93 interfaced with the interface controller 92 which allows the interface controller 92 to determine when frames of the second frame type occur.

As will be explained in more detail with reference to FIG. 10 to FIG. 12 below, in any one of the various embodiments described herein payload data may also be included, e.g., in a pilot section and/or an acknowledgment section of a frame. For illustration, for at least some frames of the second frame type, the frames may include slots for uplink data payload and/or downlink data payload.

The frames of the second frame type which include payload data may be combined with other frames which do not include payload data at a certain ration. The ratio may be selected in dependence on a number of machine communication terminals, for example.

The base station or another cellular network node may be configured to dynamically determine which pilot sections and/or acknowledgment sections should be used for payload data. The base station or other cellular network node may determine, based on the number or density of terminals which have a data rate which is less than a data rate threshold in both the uplink and the downlink, how many frames of the second frame type which do not include payload data are combined with a frame of the second frame type which includes payload data. The base station or other cellular network node may also determine how many slots are provided for payload data in the pilot section 51 and/or the acknowledgment section 52 of a frame of the second frame type.

Figure 10:
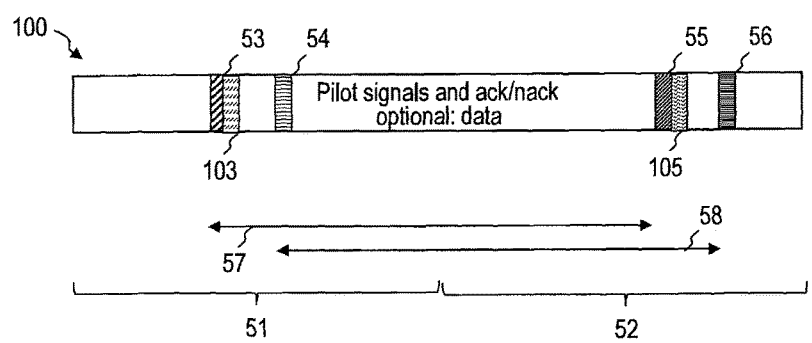
FIG. 10 shows a frame structure of frame of a second frame type used in embodiments of the invention.

FIG. 10 shows a frame of the second frame type 100 which may be periodically included in a sequence of frames in methods and devices according to embodiments. The frame 100 is utilized for pilot signals and signaling associated with the pilot signals, e.g. positive or negative acknowledgments for the pilot signals and/or scheduling information. The frame 100 further includes payload data 103, 105.

The frame of the second frame type 100 includes a time slot 53 in which the terminal may transmit its pilot signal. This time slot 53 will also be referred to as pilot time slot 53 herein. The frame of the second frame type 100 includes a time slot 55 in which the base station is scheduled to transmit a message associated with the pilot signal to the respective terminal. This time slot 55 is also referred to as acknowledgment time slot 55 herein. The acknowledgment time slot 55 is separated in the time domain from the associated pilot time slot 53 by a delay 57, as explained with reference to FIG. 3 above.

A pair of pilot time slot and associated acknowledgment time slot may be included in the frame of the second frame type 100 for each other terminal which transmits its pilot signal in the frame of the second frame type 100. This is schematically illustrated for a pilot time slot 54 in which another terminal may transmit its pilot signal and an acknowledgment time slot 56 in which the base station may transmit an acknowledgment and/or scheduling information to the other terminal. The acknowledgment time slot 56 and the pilot time slot 54 are separated in time by a delay 58. The delay 58 may have the same size as the delay 57. The acknowledgment time slot 56 and the pilot time slot 54 associated with one terminal may be separated by the same number of time slots as the acknowledgment time slot 55 and the pilot time slot 53 associated with another terminal.

The frame of the second frame type 100 may include at least one time slot for uplink payload transmission 103 which is received by the base station. Alternatively or additionally, the frame of the second frame type 100 may include at least one time slot for downlink payload transmission 105 which is transmitted by the base station.

The number of slots for payload transmission 103, 105 may be adjusted dynamically. One criterion taken into account by the base station or another cellular network node may be the number or density of terminals which have a data rate smaller than a threshold data rate. Alternatively or additionally, the overall system load may be taken into consideration when determining the amount of payload data which may be included in the frame of the second frame type 100.

Uplink payload data 103 may be included in a half 51 of the frame of the second frame type 100 which includes the pilot time slots. Downlink payload data 105 may be included in another half 52 of the of the frame of the second frame type 100 which includes the ack/nack time slots.

Frames of the second frame type 100 which include payload data may be combined with frames of the second frame type 50 which do not include payload data and which serve to keep terminals synchronized to the base station. The frames of the second frame type 100 which include payload data may be combined with frames of the second frame type 50 which do not include payload data may be provided alternatingly. The fraction of of frames of the second frame type 100 which include payload data may be set in dependence on the number of machine communication terminals or other criteria.

Figure 11:
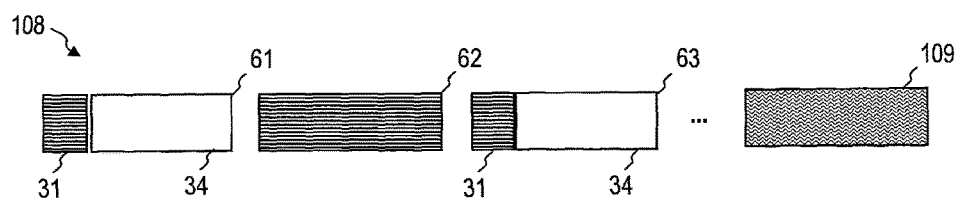
FIG. 11 shows a sequence of frames in a communication system according to an embodiment.

FIG. 11 is a schematic diagram of a sequence of frames 108. The sequence of frames 108 includes frames of the first frame type 61, 63, 64. A frame of the second frame type 62 may be inserted in between two frames of the first frame type 61, 63. Another frame of the second frame type 109 may be inserted in between two frames of the first frame type. The frame of the second frame type 109 may include payload data. The frame of the second frame type 109 may be configured as explained with reference to FIG. 10.

Frames of the second frame type 62 without payload data and frames of the second frame type 109 with payload data may be alternated. A fraction of frames of the second frame type 109 with payload data may increase compared to another fraction of frames of the second frame type 62 without payload data when the number of machine communication terminals increases, for example. In each of the frames of the second frame type 109 with payload data, the number of pilot signals which are accompanied by an associated payload data transmission may be set by the base station or another cellular network node.

Figure 12:
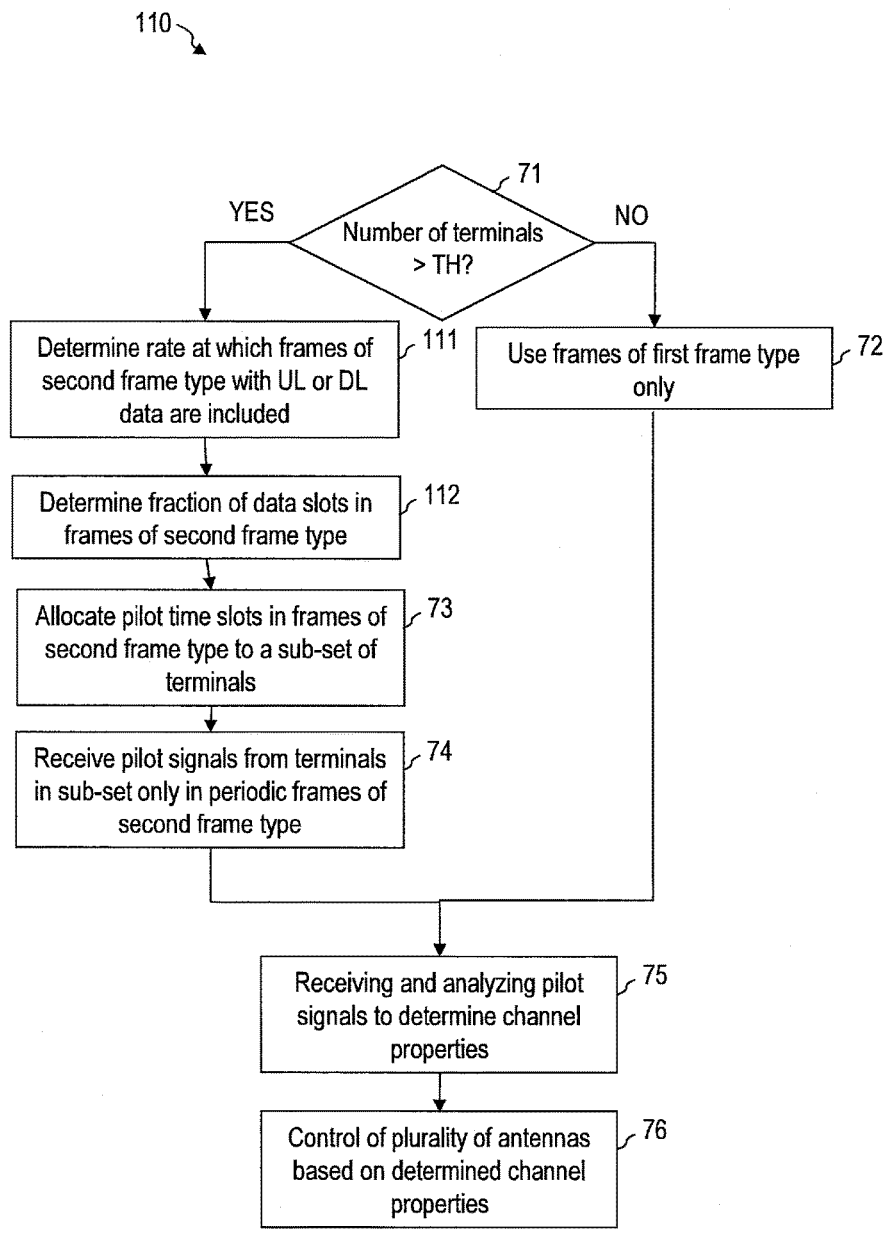
FIG. 12 is a flow chart of a method performed by a base station according to an embodiment.

FIG. 12 is a flow chart of a method 110 which may be performed by a base station 20 according to an embodiment.

At 71, the base station may determine whether the total number of terminals in the cell is greater than a threshold TH. If the number of terminals does not exceed the threshold TH, only frames of the first frame type are used at 72. At 72, the base station may perform a resource allocation which causes the terminals to transmit their pilot signals in the header of conventional MIMO frames as explained with reference to FIG. 2 and FIG. 6.

If the number of terminals is greater than the threshold TH, the method proceeds to step 111.

At 111, a ratio of frames of the second frame type which include payload data may be determined. The ratio may define the number of frames of the second frame type which include payload data as compared to the total number of frames of the second frame type. The ratio may be determined in dependence on the number of terminals which only need to be kept synchronized to the base station, for example, and/or in dependence on a number or density of terminals which have low data rate requirements. The ratio may be determined in dependence on the system configuration, so as to accommodate the communication needs of both machine communication terminals and terminals which are not machine communication terminals.

At 112, the number of time slots for payload data which is included in each frame of the second frame type which includes payload data may be set. The number of time slots may be set in dependence on the number or density of terminals which have low data rate requirements. Machine communication terminals are exemplary for such terminals.

At 73, time slots in the periodically inserted frames of the second frame type may be used for the transmission of pilot signals and the transmission of downlink acknowledgment messages and/or pilot scheduling information to a sub-set of terminals. At 74, the base station receives pilot signals from the terminals in the sub-set only in the periodic frames of the second frame type. These steps may be implemented as explained with reference to FIG. 6.

Another sub-set of terminals may continue to transmit their pilot signals in headers of frames of the first frame type. The other sub-set may be disjoint with the sub-set of terminals which transmit their pilot signals in the frames of the second frame type, as explained above.

At 75, the base station logic 21 analyzes pilot signals received in the frames of the second frame type and in the headers of the frames of the first frame type. At 76, the base station logic 21 may control the transmission of radio signals through the plurality of antennas 22 to focus radio energy towards a terminal to receive radio signals from the terminal or to transmit radio signals to the terminal, as explained above.

While embodiments have been described with reference to the drawings, modifications and alterations may be implemented in other embodiments.

For illustration, while frames of the second frame type may be utilized selectively depending on a number of terminals in a cell, other criteria may be used additionally or alternatively to determine when frames of the second frame type are to be used. In embodiments, frames of the second frame type may be included depending on a number of terminals in idle mode. For illustration, when a number of time slots in the header of a frame of the first frame type which is used for pilot signals of idle terminals is greater than a given threshold, frames of the second frame type may be periodically inserted into the sequence of frames to remove the idle terminals from the header of the frames of the first frame type.

For further illustration, while the terminals may be mobile phones, the terminals may also be configured as any one of a wide variety of other portable devices, for example. While embodiments of the invention may be used for video or other data streaming in dense crowd scenarios, the embodiments are not limited to this particular field of use.

Embodiments of the invention may be used in massive MIMO systems, without being limited thereto.

The invention claimed is:

1. A method of determining radio channel properties in a cellular multiple-input and multiple-output (MIMO) system, the cellular MIMO system comprising a base station having a plurality of antennas, the method comprising:
   receiving, by the plurality of antennas, pilot signals in each frame of a sequence of frames, and
   analyzing the pilot signals by the base station to determine the radio channel properties of radio channels between respectively each one of a plurality of terminals and the base station,
   wherein the sequence of frames comprises
      frames of a first frame type which respectively have a first number of time slots in which the base station receives the pilot signals, and
      frames of a second frame type which respectively have a second number of time slots in which the base station receives the pilot signals, the second number of time slots being greater than the first number of time slots, and
      the frames of the second frame type are included periodically in the sequence of frames after a number M of the frames of the first frame type, and
   wherein the pilor signals are received in each time slot of a first half of the frame of the second frame type.

2. The method of claim 1, further comprising
selectively allocating, by the base station, time slots in the frames of the second frame type to a sub-set of terminals located in a cell served by the base station.

3. The method of claim 2,
wherein the base station determines whether a terminal is to be included in the subset based on whether the terminal is in active mode or in idle mode.

4. The method of claim 1, further comprising:
causing, by the base station, several terminals which transmit pilot signals in frames of the first frame type to respectively share one time slot in the frames of the first frame type for transmitting their respective pilot signals,
wherein the base station performs downlink control signaling to cause the several terminals to transmit their pilot signals in the frames of the first frame type in an alternating manner.

5. The method of claim 1,
wherein the pilot signal comprises one of a request for data when the terminal is in idle mode or a request for entering an idle mode when a transmission of payload data is completed.

6. The method of claim 1,
wherein uplink payload data and downlink payload data are transmitted only in frames of the first frame type.

7. The method of claim 1, further comprising:
controlling a downlink signal transmission through the plurality of antennas based on the determined radio channel properties to focus radio energy at one of the plurality of terminals.

8. The method of claim 1, wherein terminals in idle mode are assigned to use the second frame type.

9. The method of claim 8, further comprising detecting that greater than a predetermined threshold number of idle terminals are using the first frame type for pilot signals and, in response to the detecting, inserting the frames of the second frame type.

10. The method of claim 1, further comprising detecting that greater than a predetermined threshold number of terminals are in a cell of the base station and, in response to the detecting, inserting the frames of the second frame type.

11. A base station for a cellular multiple-input and multiple-output (MIMO) system, the base station comprising:
a plurality of antennas configured to receive pilot signals in each frame of a sequence of frames, the sequence of frames comprising
frames of a first frame type which respectively have a first number of time slots in which the base station receives the pilot signals, and
frames of a second frame type which respectively have a second number of time slots in which the base station receives the pilot signals, the second number of time slots being greater than the first number of time slots; and
a logic coupled to the plurality of antennas and configured to analyze the pilot signals to determine radio channel properties of radio channels between each one of a plurality of terminals and the base station; and
wherein the frames of the second frame type are included periodically in the sequence of frames after a number M of frames of the first frame type; and
wherein the pilot signals are received in each time slot of a first half of the frame of the second frame type.

12. A cellular multiple-input and multiple-output (MIMO) system, comprising:
a base station according to claim 11, and
at least one terminal, comprising:
a wireless interface for communication with a base station of the MIMO system; and
a control device coupled to the wireless interface and configured to:
select a frame type for transmitting pilot signals from a first frame type with a first number of time slots for pilot signals and a second frame type with a second number of time slots for pilot signals, wherein the frames of the second frame type have a greater number of time slots for pilot signals than the frames of the first frame type, and wherein the second number of time slots being each time slot of a first half of the second frame type, and
control the wireless interface to transmit pilot signals only in frames of the selected frame type, wherein frames of the second frame type are included periodically in a sequence of frames which comprises a number M of frames of the first frame type in between two frames of the second frame type.

13. A terminal for a cellular multiple-input and multiple-output (MIMO) system, the terminal comprising:
a wireless interface for communication with a base station of the MIMO system; and
a control device coupled to the wireless interface and configured to
select a frame type for transmitting pilot signals from a first frame type with a first number of time slots for pilot signals and a second frame type with a second number of time slots for pilot signals, wherein the frames of the second frame type have a greater number of time slots for pilot signals than the frames of the first frame type, and wherein the second number of time slots being each time slot of a first half of the second frame type, and
control the wireless interface to transmit pilot signals only in frames of the selected frame type, wherein frames of the second frame type are included periodically in a sequence of frames which comprises a number M of frames of the first frame type in between two frames of the second frame type.

14. The terminal of claim 13,
the control device being configured to select the frame type based on signaling received from the base station.

* * * * *

UNITED STATES PATENT AND TRADEMARK OFFICE
CERTIFICATE OF CORRECTION

PATENT NO. : 10,348,465 B2  
APPLICATION NO. : 15/128258  
DATED : July 9, 2019  
INVENTOR(S) : Erik Bengtsson et al.

Page 1 of 1

It is certified that error appears in the above-identified patent and that said Letters Patent is hereby corrected as shown below:

In the Claims

In Claim 1, Column 20, Line 58, after "wherein the" should read "pilot signals".

Signed and Sealed this  
Fourth Day of August, 2020

Andrei Iancu  
*Director of the United States Patent and Trademark Office*